United States Patent [19]

Lem

[11] Patent Number: 4,696,386
[45] Date of Patent: Sep. 29, 1987

[54] CONVEYOR SYSTEM DIVERTER TURN ASSEMBLY

[76] Inventor: Hans J. Lem, 352 Hillview Ter., Franklin Lakes, N.J. 07417

[21] Appl. No.: 745,257

[22] Filed: Jun. 14, 1985

[51] Int. Cl.⁴ .............................................. B65G 47/46
[52] U.S. Cl. ...................... 198/372; 198/415; 198/782
[58] Field of Search ............... 198/372, 457, 367, 370, 198/413–415, 782

[56] References Cited

U.S. PATENT DOCUMENTS

| Re. 25673 | 11/1964 | Burt .................. | 198/370 |
|---|---|---|---|
| 2,730,247 | 1/1956 | Lawson .................. | 214/6 |
| 2,740,351 | 4/1956 | Anderson .................. | 101/11 |
| 3,036,691 | 5/1962 | Byrnes .................. | 198/367 |
| 3,072,095 | 1/1963 | Keessen et al. .................. | 118/6 |
| 3,121,490 | 2/1964 | Rainbow .................. | 198/633 |
| 3,166,182 | 1/1965 | Vaughan et al. .................. | 198/345 |
| 3,174,613 | 3/1965 | Insolio .................. | 198/370 |
| 3,185,288 | 5/1965 | Rowekamp .................. | 198/459 |
| 3,334,723 | 8/1967 | Reed et al. .................. | 198/367 |
| 3,388,816 | 6/1968 | Lueddeke et al. .................. | 214/6 |
| 3,545,588 | 12/1970 | Corley .................. | 198/345 |
| 3,642,113 | 2/1972 | Burgis .................. | 198/372 |
| 3,650,376 | 3/1972 | Burgis et al. .................. | 198/633 |
| 3,756,374 | 9/1973 | Burt et al. .................. | 198/457 |
| 3,785,195 | 1/1974 | Yasuhiro et al. .................. | 73/37 |
| 3,910,402 | 10/1975 | Dean .................. | 198/370 |
| 3,934,707 | 1/1976 | Bowman .................. | 198/460 |
| 3,965,811 | 6/1976 | Mae .................. | 100/4 |
| 3,983,988 | 10/1976 | Maxted et al. .................. | 198/367 |
| 4,029,198 | 6/1977 | Lingl, Jr. .................. | 198/425 |
| 4,149,626 | 4/1979 | Holt .................. | 198/718 |
| 4,189,273 | 2/1980 | Soderstrom et al. .................. | 198/367 |
| 4,328,889 | 5/1982 | Maxted .................. | 198/367 |
| 4,358,010 | 11/1982 | Besch .................. | 198/838 |
| 4,511,030 | 4/1985 | Lem .................. | 198/633 |

FOREIGN PATENT DOCUMENTS

| 2748434 | 5/1979 | Fed. Rep. of Germany ...... | 198/598 |
|---|---|---|---|
| 7903710 | 11/1980 | Netherlands .................. | 198/457 |

*Primary Examiner*—Joseph E. Valenza
*Attorney, Agent, or Firm*—Pahl, Lorusso & Loud

[57] ABSTRACT

In the diverter turn assembly disclosed herein, an array of wheels are mounted on rocking frames so as to be vertically shiftable between a first position which the wheels are retracted below the nominal top surface of the conveyor and a second position in which they are raised above that level so as to engage articles being transported by the conveyor system. The wheels are individually adjustable as to angular orientation and are driven at respective preselected speeds to permit an article to be diverted and/or reoriented with respect to the nominal conveyor path.

6 Claims, 4 Drawing Figures

CONVEYOR SYSTEM DIVERTER TURN ASSEMBLY

BACKGROUND OF THE INVENTION

The present invention relates to a conveyor system diverter assembly and more particularly to such an assembly which permits an article being conveyed to be reoriented as well as diverted from the nominal conveyor path.

While various diverters and reorienters are known in the prior art, these systems typically have not been able to perform both functions in a compact and efficient manner.

Among the several objects of the present invention it may be noted the provision of a novel conveyor system diverter assembly; the provision of such an assembly which will reorient an article being diverted from a conveyor line; the provision of such an assembly which will reorient an article independently of diverting from the line; the provision of such an assembly which is highly reliable and which is of relatively simple and inexpensive construction. Other objects and features will be in part apparent and in part pointed out herein after.

SUMMARY OF THE INVENTION

The diverter assembly of the present invention is suited for use with a conveyor system in which articles are conveyed at a preselected nominal base height. A plurality of rocker frames are journaled for pivotal motion around respective rotatable shafts, each frame carrying a plurality of wheels mounted on brackets which are individually adjustable as to angular orientation with respect to the shaft. Means are provided for driving each wheel from the respective shaft at an individually selectable speed relative to the rotation of the respective shaft. Driving means are provided for rocking the frames about their respective shafts so as to move the wheels between a first position in which they are below the nominal base height and a second position in which they are above the nominal base height and will therefore engage articles being transported by the conveyor system.

BRIEF DESCRIPTION OF THE DRAWINGS

Corresponding reference characters indicate corresponding parts throughout the several views of the drawings.

DESCRIPTION OF THE PREFERRED EMBODIMENT

As indicated previously, the diverter assembly of the present invention is adapted for use in conjunction with a conveyor system, particularly a belt type conveyor system. A conveyor system which is particularly well-suited for use in conjunction with the present invention is that disclosed in U.S. patent application Ser. No. 479,254, filed on Mar. 28, 1983 by Hans Lem, now issued as U.S. Pat No. 4,511,030. In that conveyor system, a plurality of belts running over suitable bearing plates are provided for conveying articles along a predetermined path, the tops of the belts defining a nominal base height, i.e., the height at which the bottom of articles being transported rest during conveying.

Figure 1:
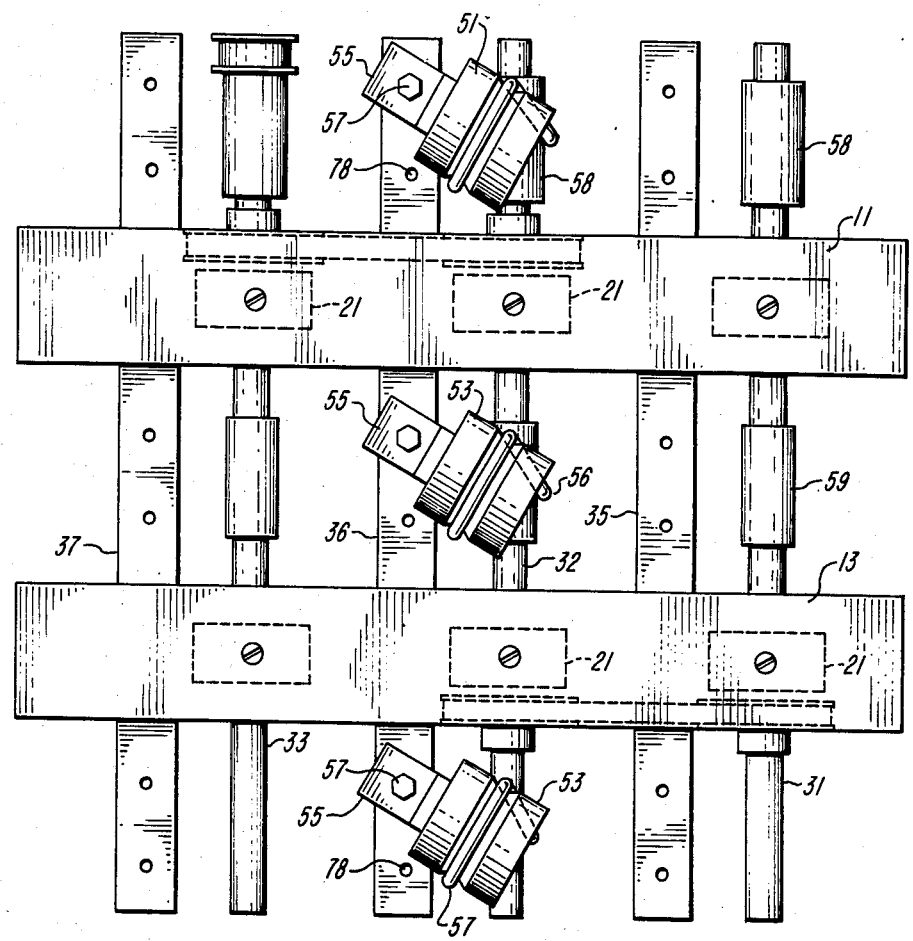
FIG. 1 is a plan view of a diverter assembly constructed in accordance with the present invention.
Figure 2:
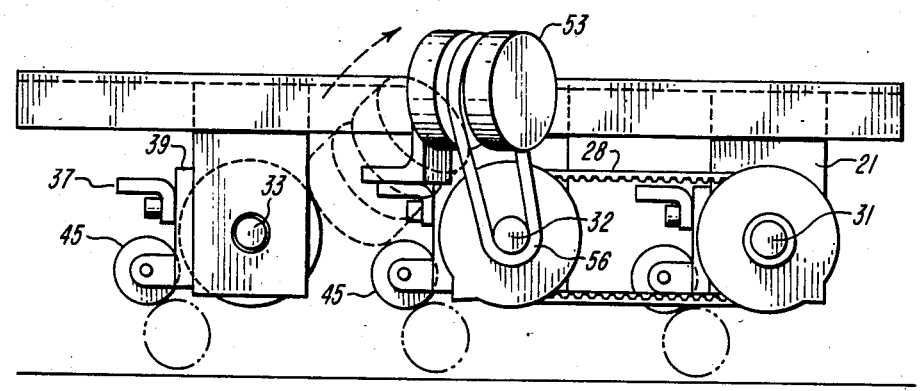
FIG. 2 is a side view with parts broken away of the diverter assembly of FIG. 1.
Figure 3:
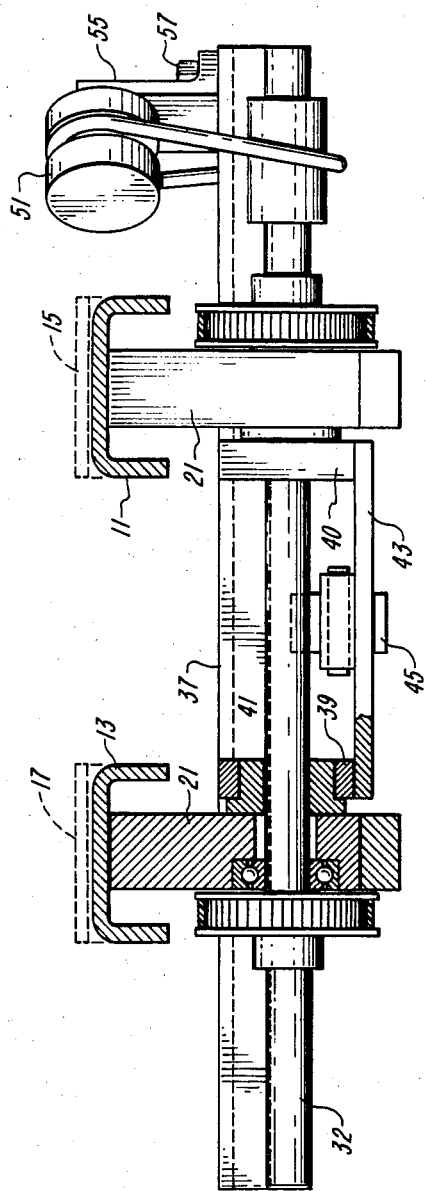
FIG. 3 is an end view of the diverter assembly showing one of the several rocker frames incorporated therein.

With reference to FIGS. 1-3, the diverter system illustrated there is adapted to be inserted into a run of the conveyor of the type described in the above-mentioned application and, to this end, includes a pair of longitudinal plates load bearing 11 and 13 over which the conveyor belts may run. The nominal positions occupied by such belts are represented by broken lines in FIG. 3, these positions being designated by reference characters 15 and 17.

Mounted under each of the plates 11 and 13 are a succession of bearing blocks 21 in which are journaled three transversely mounted rotatable shafts 31-33. As is described in greater detail hereinafter, the shafts 31-33 act both as pivots for wheel carrying rocker frames and also as driving means for individual wheels carried on those rocker frames.

The shafts 31 and 32 are linked by a timing belt 28 while the shafts 32 and 33 are linked by a timing belt 29 so that all these shafts rotate in synchronism. Typically the shafts will be driven directly from the conveyor system by means (not shown) appropriate to the given installation.

Each rocker frame comprises a beam, 35-37 respectively, which extends parallel to the respective shaft. These beams are constructed of angle stock in the embodiment illustrated. Each beam is pivotally mounted on the respective shaft by a pair of short plates 39-40 which act as bell-crank arms and extend from the beam to bearings 41 journaled on the respective shaft. Each pair of arms is joined by a plate 43 which carries roller cam follower 45 which is employed in controlling the rocking motion of the rocker frame as described in greater detail hereinafter.

Each of the rocker frames carries three wheels 51-53 which are mounted on the respect beam 35-37 by means of respective angle brackets 55. The wheels are preferably constructed of a tough resilient wear resistant materials such as polyurethane and are journaled on axles which extend from the respective angle brackets. The individual brackets 55 are mounted to the beam by means of single bolts, as indicated in reference character 57, which serve as lockable pivot points so that each wheel may be inclined with respect to the direction of conveyor flow at an angle which is individually preselectable. Preferably two or more holes 78 are provided in the beam for each bracket so that the wheels may be inclined for either direction, thus permitting diversion either to the right or to the left.

As may be seen, each of the wheels 51-53 is grooved to receive a belt, designated by reference character 56, which also passes around the respective rotatable shaft 31-33. Accordingly, rotation of the shaft will drive the wheel. However, to permit the wheels to be driven at different individually selectable speeds, each shaft is provided with collers to provide differing operative diameters to the successive belts. These collars are indicated by reference characters 58 and 59 in FIG. 1. From the point of view of the direction of flow of the conveyor, it will thus be seen that, in the particular embodiment illustrated, the right hand wheels are driven the fastest and the left hand wheels are driven the slowest. By suitable selection of the collar diameters, the speed differentials can be changed both left to right and front to back to achieve the desired movement of the article being transported.

Figure 4:
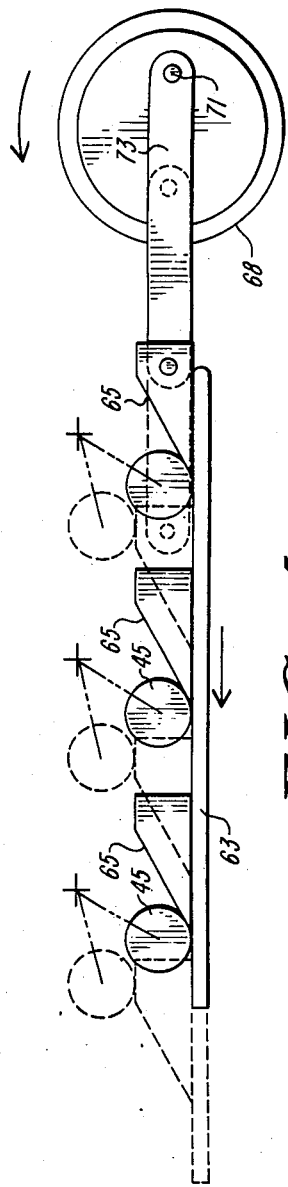
FIG. 4 is a side view, with parts broken away showing a driving mechanism for rocking the rocker frames.

As indicated previously, each rocker frame can be moved between a first position in which the wheels are below the nominal base height of the conveyor belts and a second position in which the wheels are above the nominal base height so as to engage articles being transported by the conveyor. A typical mechanism for driving this rocking motion is seen best in FIG. 4. As described previously, each of the rocker assemblies carries a roller cam follower 45 mounted between the bell crank arms 39 and 40 which pivotally mount the transverse beams 35-37. A sliding cam assembly 63 provides three ramp surfaces 65 which co-act with the followers 45 to selectively raise the wheel. The cam assembly 63 is slidable mounted in a guide (not shown) supported under the bearing blocks 21. A clutch and brake assembly 68 is provided for driving the sliding cam 63 through an eccentric 71 and a connecting rod 73. It should be understood that other means for raising and lowering the wheels, e.g., air linear actuators or electric solenoids, might also be used.

The most typical use for the apparatus of the present invention will be to both divert and reorient an article traveling down the conveyor and the system shown in FIG. 1 is set up for this sort of operation. If diversion and reorientation are not desired, the wheels are retracted and an article traveling on the belts 15 and 17 will merely continue straight on its path. If, however, the wheels are raised, an article traveling onto the assembly will be engaged by the wheels. Not only will the article be lifted off the belts and moved to the left but, because of the speed differential between the left and right hand wheels, the article will be reoriented, that is rotated around a vertical axis. As is understood by those skilled in the art this is typically desirable to properly orient the article, e.g., a box, that is to be picked up by a next conveyor stage. Since the angular orientation of each of the nine wheels may be independently set, i.e., by suitably positioning the angle bracket on which that wheel is mounted, great flexibility is provided as to the angle and the extent of diversion. Further, since the speed differential from side to side as well as front to back can be preselected merely by changing the collars 58-59, it can be seen that flexibility is also provided in the degree of reorientation applied to an article.

It should also be understood that the apparatus of the present invention may provide reorientation without diversion if this is useful in the context of the particular article handling system within which the apparatus of the present invention is incorporated. Reorientation without diversion is accomplished merely by orienting the wheels 51-53 so that they rotate in a plane parallel to the direction of the belts while retaining the speed differential from side to side. By this adjustment of the system, an article encountering the raised wheels will be lifted and reoriented because of the speed differential from side to side, but will continue straight ahead to be picked up an carried on by the same set of conveyor belts.

While the system illustrated employs a three-by-three array of rollers, it should be understood that other arrays, including non-square arrays might also be arranged in accordance with the present invention. For example, in a system for larger articles employing three conveyor belts, it might be useful to employ four rollers on each of five frames in order to provide a longer time for reorientation as the article progresses.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a conveyor system in which articles are conveyed at a preselected nominal base height, a diverter assembly comprising:
   a plurality of rotatable shafts extending transversely to the direction from which articles approach the diverter assembly;
   means for rotating at least one of said plurality of rotatable shafts;
   coupling means for causing said shafts to rotate together;
   a respective rocker frame journaled for pivotal motion around each shaft, each frame carrying a plurality of wheels mounted on respective brackets which are individually adjustable as to angular orientation with respect to said shaft;
   means for affirmatively driving each wheel from the respective shaft at an individually selectable speed ratio relative to the rotation of said respective shaft, said individually selectable speed ratio increasing across said respective shaft; and
   means for rocking said frames about their respective shafts to move the wheels between a first position in which the wheels are below the nominal base height and a second position in which the wheels are above the nominal base height so as to engage and control articles being transported by said conveyor system, said means for rocking said frames maintaining said wheels in a plane substantially parallel to the plane of the nominal base height ; said speed ratio increasing from a smaller speed ratio with which the wheel which engages and controls the inner portion of articles being transported by said conveyor system is driven to a larger speed ratio with which the wheel which engages and controls the outer portion of articles being transported by said conveyor system is driven.

2. In a conveyor system in which articles are conveyed at a preselected nominal base height, a diverter assembly comprising:
   a plurality of rotatable shafts extending transversely to the direction from which articles approach the diverter assembly;
   means for rotating at least one of said plurality of rotatable shafts;
   coupling means for causing said shafts to rotate together;

a respective rocker frame journaled for pivotal motion around each shaft, each frame carrying a plurality of wheels mounted on respective brackets which are individually adjustable as to angular orientation with respect to said approach direction;

on said shaft, collar means for providing, at the portion of said shaft adjacent each wheel, a corresponding preselectable operating diameter, said operating diameter increasing across the length of the shaft;

belt means for affirmatively driving each wheel from the respective shaft at a speed relative to the rotation of said respective shaft corresponding to said respective operating diameter; and means for rocking said frames about their respective shafts to move the wheels between a first position in which the wheels are below the nominal base height and a second position in which the wheels are above the nominal base height so as to engage and control articles being transported by said conveyor system, said means for rocking said frames maintaining said wheels in a plane substantially parallel to the plane of the nominal base height.

3. In a conveyor system in which articles are conveyed at a preselected nominal base height, a diverter assembly comprising:

a plurality of rotatable shafts extending transversely to the direction from which articles approach the diverter assembly, each of said shafts providing a succession of different effective operating diameters along the length of the shaft, said operating diameters increasing across the length of the shaft;

means for rotating at least one of said plurality of rotatable shafts;

coupling means for causing said shafts to rotate together;

a respective rocker frame journaled for pivotal motion around each shaft, each frame carrying a plurality of wheels mounted on respective brackets which are individually adjustable as to angular orientation with respect to said approach direction;

belt means for affirmatively driving each wheel from the respective shaft at an individually preselected speed corresponding to the effective operating diameter of the corresponding portion of the respective shaft; and means for rocking said frames about their respective shafts to move the wheels between a first position in which the wheels are below the nominal base height and a second position in which the wheels are above the nominal base height so as to engage and control articles being transported by said conveyor system, said means for rocking said frames maintaining said wheels in a plane substantially parallel to the plane of the nominal base height.

4. In a conveyor system in which articles are conveyed, a diverter assembly comprising:

a plurality of rotatable shafts extending transversely to the direction from which articles approach the diverter assembly, each of said shafts providing a succession of different effective operating diameters along the length of the shaft, said operating diameter increasing across the length of the shaft;

means for rotating at least one of said plurality of rotatable shafts;

coupling means for causing said shafts to rotate together;

adjacent each shaft, a frame carrying a plurality of wheels mounted on respective brackets which are individually adjustable as to angular orientation with respect to said approach direction; and belt means for affirmatively driving each wheel from the respective shaft at an individually preselected speed corresponding to the effective operating diameter of the corresponding portion of the respective shaft.

5. Apparatus as set forth in claim 4 wherein said different effective operating diameters are provided by collars in addition to the basic diameter of the respective shaft.

6. In a conveyor system in which articles are conveyed at a preselected nominal base height, a diverter assembly comprising:

a plurality of rotatable shafts extending transversely to the direction from which articles approach the diverter assembly, each of said shafts providing a succession of different diameters along the length of the shaft, said diameters increasing across the length of the shaft;

means for rotating at least one of said plurality of rotatable shafts;

coupling means for causing said shafts to rotate together;

a respective rocker frame journaled for pivotal motion around each shaft;

on each frame, a plurality of brackets, each of which is pivotally mounted on the frame so as to be individually adjustable as to angular orientation with respect to said shaft;

on each bracket, a grooved roller;

belt means linking the grooved roller and the corresponding portion of the respective shaft for driving each roller at an individually preselectable speed ratio relative to the rotation of said respective shaft; and means for rocking said frames about their respective shafts to move the rollers between a first position in which the rollers are below the nominal base height and a second position in which the rollers are above the nominal base height so as to engage and control articles being transported by said conveyor system, said means for rocking said frames maintaining said wheels in a plane substantially parallel to the plane of the nominal base height.

* * * * *